United States Patent [19]

Tsukushi

[11] Patent Number: 5,685,513
[45] Date of Patent: Nov. 11, 1997

[54] VACUUM-SUCTION ATTACHMENT PAD

[75] Inventor: Tadaaki Tsukushi, Tokyo, Japan

[73] Assignee: Nihon Biso Co., Ltd., Tokyo, Japan

[21] Appl. No.: 443,272

[22] Filed: May 17, 1995

[51] Int. Cl.$^6$ .................... B66C 1/02; E04G 3/10
[52] U.S. Cl. .................... 248/363; 248/362; 248/205.9; 269/21; 294/64.1
[58] Field of Search .................. 248/205.8, 205.9, 248/362, 363; 269/21; 294/64.1

[56] References Cited

U.S. PATENT DOCUMENTS

| | | | |
|---|---|---|---|
| 1,117,548 | 11/1914 | Bouchery | 248/362 |
| 2,317,348 | 4/1943 | Wekeman | 248/363 |
| 3,158,381 | 11/1964 | Yamamura | 248/362 X |
| 3,307,816 | 3/1967 | Cocito | 248/362 |
| 3,591,228 | 7/1971 | Webb | 248/363 X |
| 4,221,356 | 9/1980 | Fortune | 248/363 |
| 4,236,693 | 12/1980 | McCrea | 248/205.9 X |
| 4,557,514 | 12/1985 | Cushman et al. | 248/362 X |
| 4,650,233 | 3/1987 | Mang et al. | 248/363 X |
| 4,718,629 | 1/1988 | Block et al. | 248/363 |
| 5,385,184 | 1/1995 | Mellor | 248/363 X |

FOREIGN PATENT DOCUMENTS

| | | | |
|---|---|---|---|
| 2537040 | 3/1977 | Germany | 269/21 |
| 1-203193 | 8/1989 | Japan | 294/64.1 |
| 386275 | 9/1991 | Japan . | |
| 146868 | 9/1954 | Sweden | 269/21 |
| 1249294 | 10/1971 | United Kingdom | 294/64.1 |

*Primary Examiner*—Wynn E. Wood
*Assistant Examiner*—Laura A. Saladino
*Attorney, Agent, or Firm*—Hedman, Gibson & Costigan, P.C.

[57] ABSTRACT

A suction chamber is provided in the rear portion of a pad body remote from an external pad supporting surface. The fore end portion of the pad body facing the pad supporting surface is divided into a plurality of sucking compartments for communication with the suction chamber. An air flow passage is provided for communication with the suction chamber. Valve mechanisms are provided in air flow paths between the respective sucking compartments and the suction chamber and are closable by a sucked air flow occurring during vacuum suction. Further, an automatic switching valve is provided in a part of the air flow passage in such a manner that the switching valve is caused to open in response to abutment against the pad supporting surface of the pad body. The air flow passage is formed in such a manner that a direction of force acting to cause the automatic switching valve to open differs from a direction of counteractive force against a spring structure that normally urges the switching valve to close.

2 Claims, 6 Drawing Sheets

VACUUM-SUCTION ATTACHMENT PAD

BACKGROUND OF THE INVENTION

The present invention relates generally to vacuum-suction attachment pads. More particularly, the present invention relates to a vacuum-suction attachment pad which is capable of properly attaching to a desired external surface by vacuum suction, with no possibility of any insufficient or unsuccessful attachment, even when applied to an uneven surface such as a tiled wall surface having denting joints between tiles.

The present invention also relates to a vacuum-suction attachment pad which, for use, is connected to a single vacuum suction apparatus together with one or more other such pads for cooperatively achieving firm attachment to a desired external surface and which realizes a highly improved attaching characteristic. The present invention further relates to a vacuum-suction attachment pad which effectively contributes to reduction of the size of a vacuum pump employed as the vacuum suction apparatus.

The vacuum-suction attachment pad in accordance with the present invention is particularly useful when applied as a simplified swing prevention device for preventing the undesirable swing of a powered suspended scaffold or cage for a high-place work along an external surface to be worked on.

Work machines like manned or unmanned powered suspended scaffolds or cages carrying working equipments such as a robot etc. are extensively employed today, in order to safely and efficiently perform high-place works such as cleaning, maintenance or inspection of a large-scale wall surface of a high- or medium-rise building, large tank, ship, power station or other structure, and works to lift/lower loads to and from a high place. For example, in the case where the wall surface of a building is to be worked on by such a machine, a scaffold or cage, which is suspended via wire ropes by a winch provided in a roof car on the roof floor or a winch carried in the cage, is moved vertically along the wall surface to be positioned at a predetermined surface portion. However, in mechanical works employing such a manned or unmanned cage, the suspended cage tends to swing horizontally to a considerable degree in response to specific motions of the machine or due to strong wind pressure or the like because it is in an unstable suspended state, whether the winch is carried in the cage or provided separately in the roof car on the roof floor.

To cope with this problem, there have been proposed various devices for preventing the swing of the suspended cage, which employ vacuum-suction attachment pads fixedly mounted on the distal ends (ends facing the wall surface) of two arms provided on the opposite sides of the cage. These vacuum attachment pads are connected, via piping, in fluid communication with a vacuum pump carried in the cage. The intended work along the work is performed after having positionally fixed the cage to the wall surface by operating the vacuum pump to place the interior of the vacuum-suction attachment pads in condition to effect vacuum suction, pressing the pads against the wall surface to be worked on, i.e., pad supporting surface, and pumping air out of the interior of the pads.

In such swing-prevention devices using the vacuum-suction attachment pads, the attaching force necessary for preventing the swing of the suspended cage is determined by the degree of vacuum and air pumping-out (or discharge) amount per attaching area that are attainable by the employed vacuum pump and the like, and the pads are designed to attach to any smooth surface irrespective of the material forming the surface. In fact, the vacuum-suction attachment pads can attach to smooth surfaces of glass, precast concrete (PC) board, ordinary concrete and tile and even to pattern-painted surfaces of these materials as long as they are sufficiently smooth.

But, where the supporting surface to which the vacuum-suction attachment pads are applied has unevenness, e.g., where the pad supporting surface has joints connecting tiles or PC boards, gaps are formed between the uneven pad supporting surface and the pads, and hence there would occur significant air leakage through these gaps during the air suction by the vacuum pump, thus resulting in insufficient or unsuccessful attachment to the surface of the pads. Consequently, the traditional vacuum-suction attachment pads could not obtain an attaching force necessary for effectively preventing the swing of the suspended cage.

In order to minimize the adverse effect of unevenness in the supporting surface, it is necessary to ensure a sufficient air discharge amount and to increase the cross-sectional area of the individual pipes connecting the vacuum-suction attachment pads and the vacuum pump.

However, in the case where two vacuum-suction attachment pads are connected to a single vacuum pump via pipes of increased diameter, if only one of the pads is in proper close contact with the pad supporting surface for vacuum suction attachment thereto while the other pad is not, then the vacuum suction is initially effected only in the other pad since it presents smaller suction resistance due to its improper contact with the surface. As the result, the vacuum suction in the one attachment pad closely contacting the supporting surface tends to be insufficient for properly preventing the swing of the suspended cage.

One proposed solution to this problem is to insert a valve in the pipe between the vacuum pump and each of the vacuum-suction attachment pads so that, in effecting the vacuum suction, the valve associated with the pad not in proper contact with the pad supporting surface may be manually closed. However, this proposed solution would significantly complicate the necessary operations for preventing the swing of the suspended cage.

Further, in order to reduce the air leak from the vacuum-suction attachment pads, it has been customary to bond, by an adhesive agent, a resilient sealing member to each of the pads along the peripheral edge of the fore end thereof facing the supporting surface. But, this resilient sealing member would easily wear or be damaged because it is pressed against and/or detached from the pad supporting surface each time the cage is moved from one place to another along the surface, and thus the sealing member has to be replaced more or less at regular intervals. In replacing the sealing member, it is necessary to remove the adhesive agent left over on the pad after the sealing member is peeled off, and this makes the replacement a very complicated and time-consuming work.

In view of the foregoing disadvantages, the inventor of the present invention has proposed an improved vacuum-suction attachment pad in Japanese Utility Model Application No. HEI 3-86275, which is capable of simply attaching to the pad supporting surface without requiring any special operation and also facilitating the replacement of the resilient sealing member. To this end, the vacuum-suction attachment pad is provided with an automatic switching valve which, as the pad body is pressed against the pad supporting surface, acts to bring the interior of the pad into communication with a vacuum suction apparatus to effect vacuum suction therein. Also, the pad body has a peripheral groove which is formed in one end thereof facing the pad supporting surface and which has such a trapezoidal cross-sectional shape that is open toward the supporting surface and has a trapeziod bottom greater in width than the opening end. A resilient sealing member is snugly fitted in the groove by its resiliency.

According to this proposed pad, by virtue of the provision of the automatically switching (opening/closing) valve that automatically operates in response to the abutment against the supporting surface of the pad body, complicated operations are no longer required for effecting the vacuum suction, and the resilient sealing member can be replaced very simply since the sealing member is merely resiliently fitted in, not adhesively boned to, the retaining groove of trapezoidal cross-section shape.

The vacuum-suction attachment pad proposed in the Japanese utility model application can readily and properly attach to the pad supporting surface, and it also can simplify the necessary operations for replacing the resilient sealing member.

However, the inventor's further study has revealed that, although the proposed vacuum-suction attachment pad applied as a device for preventing the swing of the suspended cage presents no appreciable problems when the lifted height of the cage is relatively small, say, about 30 m, the pad's attachment to the pad supporting surface tends to be insufficient when the lifted height of the cage is much greater, say, about more than 50 m. This is because, at such a great lifted height, a given force necessary to open the pad acts to make it difficult for the pad to attach to the surface. Proper solution to this problem is eagerly wanted today since the lifted height of the cage may often exceed 100 m due to the increasing trend of buildings becoming higher and higher.

More specifically, under such a condition, immediately before the vacuum-suction attachment pad attaches to the pad supporting surface, where the automatic switching valve is closed and the interior of the pad communicating with the vacuum pump is placed in the vacuum state by the pump, a given opening force F depending on the cross-sectional area of the automatic switching valve (F=PA, where P represents a pressure when the atmospheric pressure is assumed to be zero, and A is the cross-sectional area of the valve) acts to open the valve. This opening force F is constant irrespective of the lifted height of the cage. Therefore, the urging force of the compression spring must be slightly greater than the opening force F to maintain the automatic switching valve in the closed state before the pad is abutted against the pad supporting surface.

Then, as the body of the vacuum-suction attachment pad comes into contact with the pad supporting surface, the automatic switching valve is opened by the resultant reactive force from the pad supporting surface, so that the air within the vacuum-suction attachment pad is sucked or pumped out by the vacuum pump, upon which a pressure difference disappears present between the inside and outside of the automatic switching valve. Consequently, the urging or pressing force of the compression spring acts, as a reactive force, on the attachment pad, and the magnitude of this reactive force is determined by the compression spring. However, when the cage suspended via wire ropes is at a great lifted height, the cage would very easily move even at a small swing angle. Namely, as the lifted height becomes greater, the cage tends to move and detach from the supporting surface by application of a smaller reactive force.

Thus, in the case of the vacuum-suction attachment pad proposed in the above-mentioned Japanese utility model application, the compression spring force, i.e., the reactive force imparted from the supporting surface to the pad becomes greater as the lifted height of the cage increases. Therefore, at a great lifted height, the attachment pad would be readily detached from the pad supporting surface as soon as the pad is placed into contact with the surface due to the reactive force therefrom, resulting in insufficient or unsuccessful attachment to the surface.

In addition to the above-discussed problem caused by the reactive force of the compression spring, there is a further problem that, where the reactive force necessary for opening the automatic switching valve in response to the abutment against the supporting surface of the attachment pad is greater than the force necessary for causing the pad body to separate from the surface, the pad, for similar reasons to the above-mentioned, would be detached from the surface before the pad actually abuts against the surface to open the automatic switching valve.

SUMMARY OF THE INVENTION

It is therefore an object of the present invention to provide a vacuum-suction attachment pad which is capable of properly attaching to a desired surface by vacuum suction, with no possibility of any insufficient or unsuccessful attachment, even when it is applied to an uneven surface such as a tiled wall surface having denting joints between tiles.

It is another object of the present invention to provide a vacuum-suction attachment pad which is suitable for use as a device for preventing the swing of a cage suspended for operation at a high place, without causing any of the above-mentioned problems.

In order to accomplish the above-mentioned object, a vacuum-suction attachment pad according to a first aspect of the present invention comprises a pad body adapted to be abutted against an external pad supporting surface to which the pad is to attach by vacuum suction, a suction chamber provided in a rear portion of the pad body remote from the pad supporting surface, a fore end portion of the pad body facing the pad supporting surface being divided by a partition wall into a plurality of sucking compartments for communication with the suction chamber, an air flow passage provided for communication with the suction chamber, and valve mechanisms provided in air flow paths between the respective sucking compartments and the suction chamber, the valve mechanisms being closable by a sucked air flow occurring during the vacuum suction.

The vacuum-suction attachment pad according to the first aspect is characterized primarily by the plurality of sucking compartments provided in the fore end portion of the pad body (i.e., the end portion facing the pad supporting surface) for communication with the suction chamber, and the valve mechanisms provided in air flow paths between the respective sucking compartments and the suction chamber and designed to be closed by a sucked air flow occurring during the vacuum suction. When vacuum suction is effected after the pad is applied to an external surface including uneven surface portions, proper vacuum suction is effected only in any of the sucking compartments which is applied to a surface portion with no unevenness because it achieves sufficient sealing from the outside so that the sucking compartment can be firmly attached to the surface. On the other hand, in the case of the sucking compartment which is applied to a surface portion with unevenness leaving a gap therebetween, the corresponding valve mechanism provided between the compartment and the suction chamber, despite insufficient sealing from the outside, is caused to close by a flow of air sucked from the outside through the gap. Once closed in the above-mentioned manner, the valve mechanism is maintained in the closed state due to a pressure difference caused between the sucking compartment and the suction chamber during execution of the vacuum suction, and this effectively prevents unwanted lowering of the arrival degree of vacuum in the suction chamber and hence in the interior of the pad body communicating with the suction chamber.

Therefore, the vacuum-suction attachment pad can properly attach to a desired external surface by vacuum suction, with no possibility of insufficient or unsuccessful attachment, even when the surface has unevenness.

A vacuum-suction attachment pad according to a second aspect of the present invention comprises a pad body adapted to be abutted against an external pad supporting surface to which the pad is to attach by vacuum suction, an air flow passage provided in a rear portion of the pad body remote from the pad supporting surface for communication with an interior of the pad body, an automatic switching valve provided in a part of the air flow passage so that the switching valve is caused to open in response to abutment against the pad supporting surface of the pad body, and a spring structure normally urging the automatic switching valve to close, the air flow passage being formed in such a manner that a direction of force acting to cause the automatic switching valve to open differs from a direction of counteractive force against the spring structure.

This vacuum-suction attachment pad is intended to provide solution to the problems encountered by the prior art pad proposed in Japanese Utility Model Application No. HEI 3-86275. Namely, as previously mentioned, when a gondola or cage suspended via wire ropes is at a great lifted height, the cage tends to easily detach from the supporting wall surface by a smaller force applied from the pad to the wall surface than when at a low lifted height. This may be due to the fact that an excessive urging force of the compression spring causes the pad body to detach from the wall surface due to the reactive force from the surface before completion of the sufficient contact of the pad body and subsequent vacuum suction.

In order to prevent such improper attachment of the pad used at a great lifted height, it may be sufficient to reduce the spring constant of the compression spring urging the spool valve so as to reduce the reactive force which the pad receives from the wall surface; however, when the vacuum pump is actuated before the attachment pad is abutted against the surface, the reduced spring constant can not resist a suction force generated by the vacuum pump, so that the automatic switching valve is undesirably opened. Thus, it is not possible to accomplish the intended function of the vacuum-suction attachment pad.

As the result of continual study, the inventor of the present invention has now found out that, by changing the position and direction of the air flow passage during the vacuum suction relative to that of the pad proposed in Japanese Utility Model Application No. HEI 3-86275 so as to minimize the effect of the vacuum-sucked air flow on the compression spring, it is allowed to reduce the spring constant without interfering with the proper opening/closing action of the spool valve, to thereby provide a satisfactory vacuum-suction attachment pad that can properly attach to the wall surface with substantially reduced reactive force from the surface. The attachment pad according to the second aspect is invented on the basis of such discovery and is characterized in that the air flow passage is formed in such a manner that a direction of force acting to cause the automatic switching valve to open differs from a direction of counteractive force against the spring structure. Because this arrangement reduces the suction force acting against the urging force of the spring structure, it is sufficient to only employ the spring structure of a smaller spring constant corresponding to the thus reduced suction force. Accordingly, it is possible to lessen the reactive force occurring as the attachment pad is abutted against the supporting surface.

Also, in view of the fact that the necessary force to open the automatic switching valve is obtained by the formula of spring force+suction force $\times\mu$ (friction coefficient), the inventor has realized that the necessary force to open the automatic switching value can be reduced by decreasing the value of the friction coefficient, and has now actually made it possible to decrease the value of the friction coefficient in the sliding part of the automatic switching valve by providing a sealing structure around the sliding part. In a preferred mode of embodiment, the automatic switching valve includes a valve body normally urged by the spring structure, a valve body receiving cylinder receiving the valve body for sliding movement therein, and a sealing structure is provided around the valve body receiving cylinder. This sealing structure prevents dust and other foreign substances from entering between the valve body and the receiving cylinder and thus minimizes the coefficient of friction therebetween.

In addition, the inventor has made it possible to substantially reduce the size of the vacuum pump employed as well as to decrease the value of the friction coefficient, by mounting on the pad body a dust filter to prevent dust and other foreign substances from entering the sliding part of the automatic switching valve more effectively.

Now, the preferred embodiments of the present invention will be described in detail below with reference to the accompanying drawings.

DETAILED DESCRIPTION OF THE INVENTION

Figure 1:
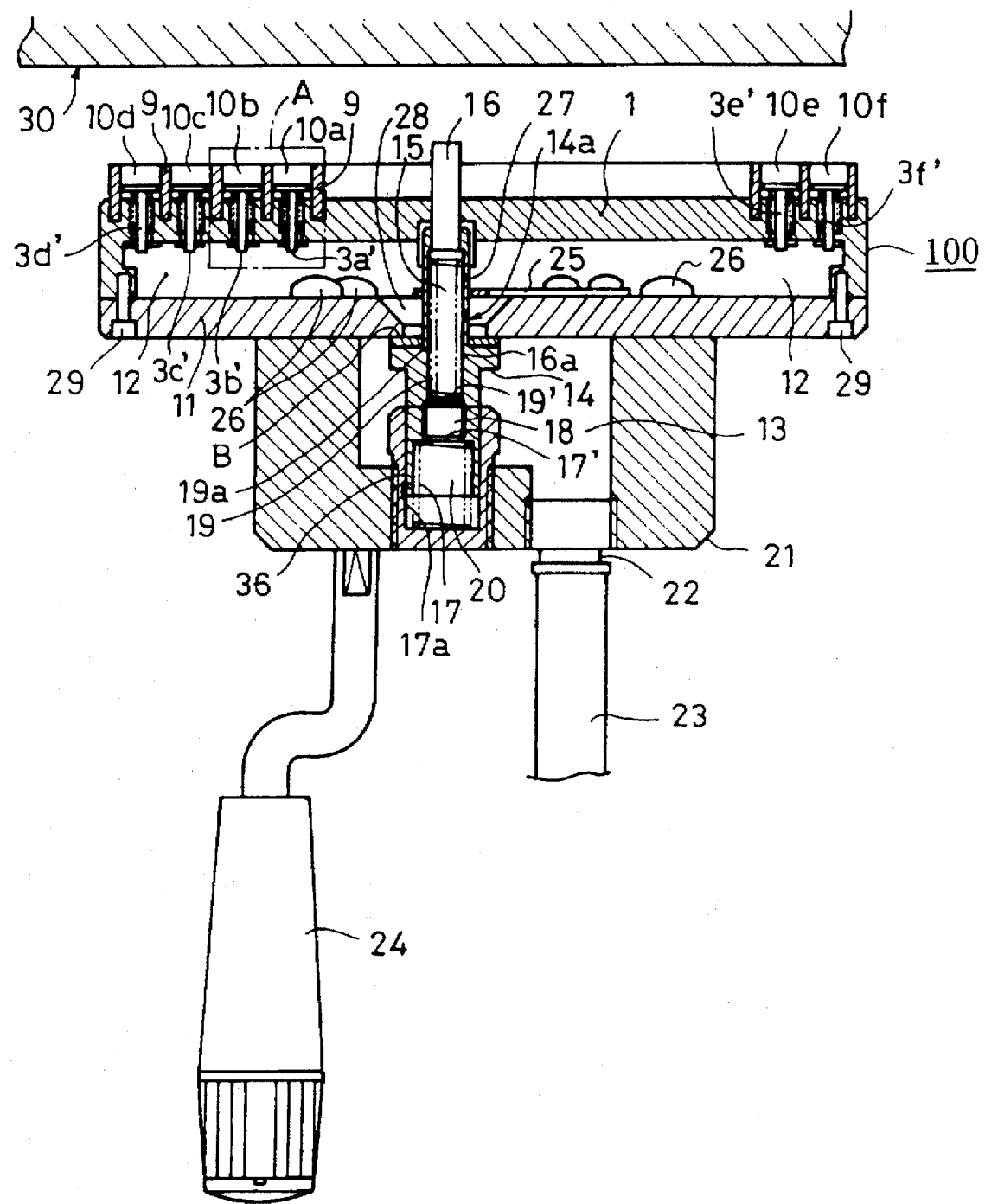
FIG. 1 is a cross-sectional view of a vacuum-suction attachment pad in accordance with a first embodiment of the present invention.
Figure 2:
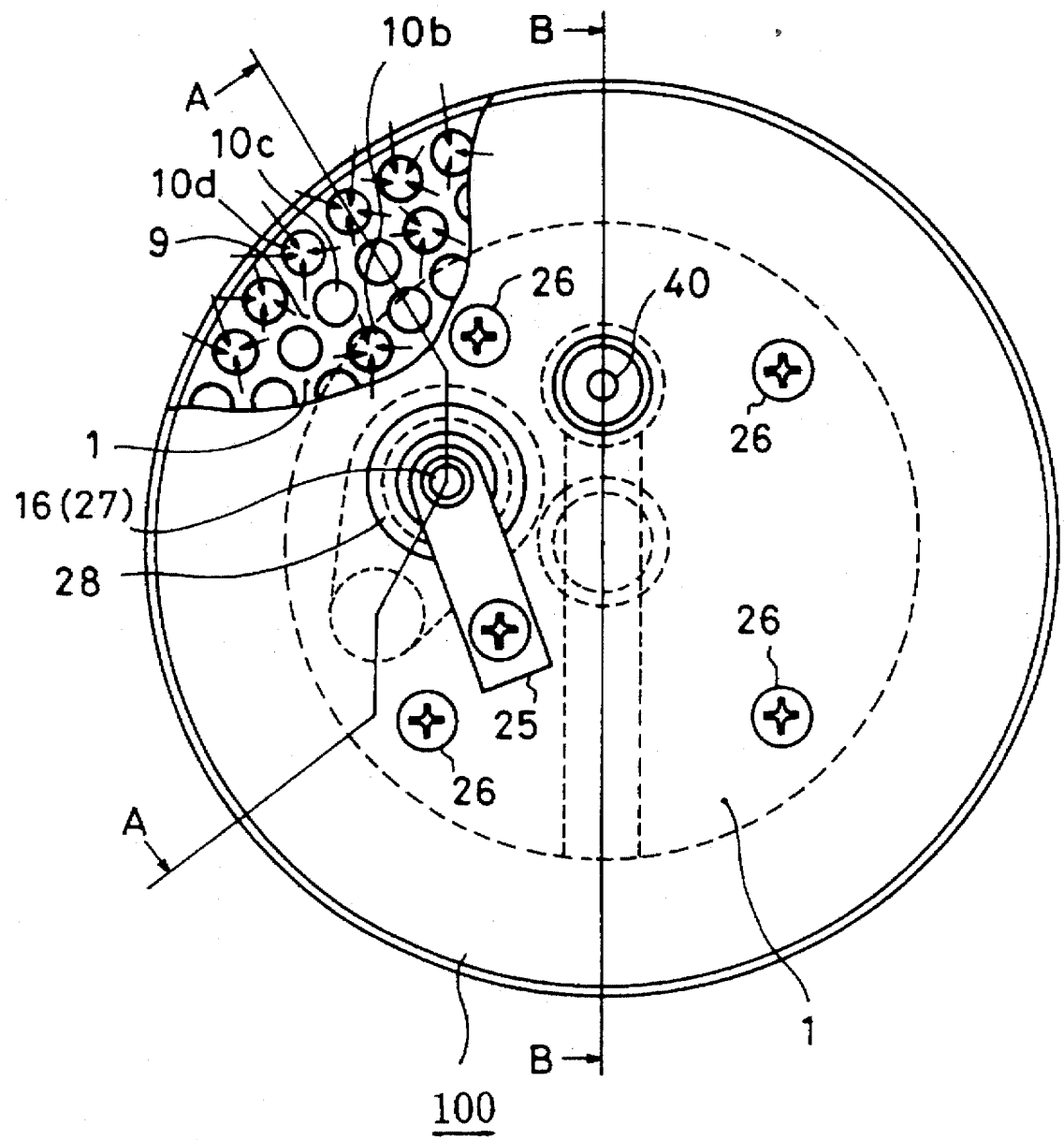
FIG. 2 is a front view of the embodiment of FIG. 1 with parts omitted for clarity of illustration.

FIG. 1 is a cross-sectional view of a vacuum-suction attachment pad in accordance with a first embodiment of the present invention, taken along line A—A of FIG. 2, and FIG. 2 is a front elevational view of the embodiment of FIG. 1 with parts omitted for clarity of illustration.

As shown in these figures, the vacuum-suction attachment pad 100 comprises a pad body 1 of a substantially cylindrical shape which is open at one end (rear end) thereof remote from an external pad supporting face 30 to which the pad 100 is to attach by vacuum suction. A disk-shaped cover 11 is secured to a rear flange of the pad body 1 by means of two screws 29, and a suction chamber 12 is defined by the pad body 1 and the cover 11. To the rear end of the cover 11 is secured a cylindrical valve box 21 by four screws 26, in which a spool valve body 14 is provided to extend across the interior to the rear end surface of the cover 11. A spool valve 16 is supported in the spool valve body 14 to extend through the suction chamber 12 and the pad body 1 toward the pad supporting surface. A handle 24 is fixed to the rear end wall of the valve box 21 in such a manner that the attachment pad 100 is movable toward the supporting surface 30, and a hose 23 is connected at one end to the rear end of the valve box 21 via a connector 22 in fluid communication with a sucked air flow passage 13 formed in the valve box 21. The other end of the hose 23 is connected to a vacuum generation source such as a vacuum pump (not shown).

A disk-shaped partition wall 9 having a multiplicity of circular holes is mounted to the fore end of the pad body 1 facing the pad supporting surface 30, and the circular holes form sucking compartments 10a to 10f. In FIGS. 1 and 2, only parts of the partition wall 9 and sucking compartments are shown with the remaining parts omitted for convenience of illustration, but it should be understood that the partition wall 9 and sucking compartments are formed over the entire surface of the fore end of the pad body 1.

Figure 3:
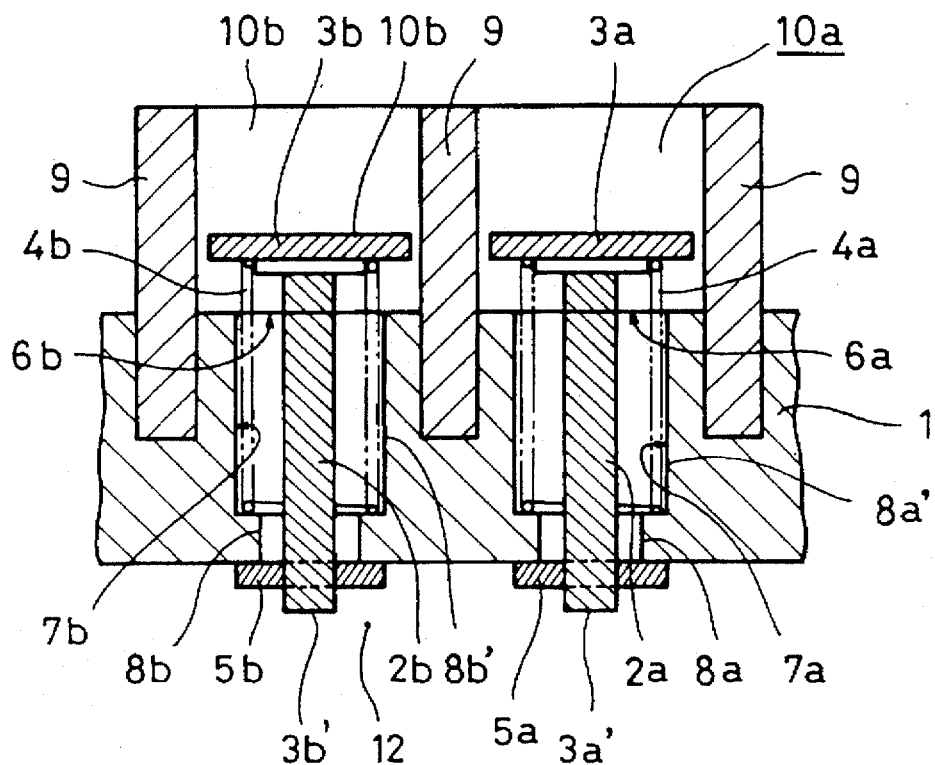
FIG. 3 is a cross-sectional view showing, in enlarged scale, section A of the first embodiment enclosed by a dot-dash-line in FIG. 1.

FIG. 3 is a cross-sectional view showing, in enlarged scale, section A of the embodiment enclosed by a dot-dash-line in FIG. 1. As best shown in FIG. 3, each of the sucking compartments (only the sucking compartments 10a and 10b are shown in the figure) and the suction chamber 12 are provided for fluid communication with each other by way of communication holes 7a and 7b, and valve mechanisms 3a' to 3f' are provided within the individual communication holes. One of the valve mechanisms 3a' of FIG. 3 will be described in detail below.

The communication hole 7a corresponding to the valve mechanism 3a' is formed in the pad body 1 and composed of a smaller-diameter section 8a and a larger-diameter section 8a' to assume a stepped cross-sectional shape. A support bar 2a is loosely received in and extends through the communication hole 7a, and it is fixed to the pad body 1 by means of a stopper 5a in the form of a cross rod which extends through the rear end portion of the support bar 2a across the smaller-diameter section 8a. To the fore end of the support bar 2a facing the pad supporting surface 30 is secured a disk-shaped valve 3a which is greater in vertical sectional area than the larger-diameter section 8a'. A spring 4a is disposed around the support bar 2a to extend between the rear end surface of the valve 3a and the stepped portion of the communication hole 7a, and, in the absence of a suction force by the vacuum pump, the spring 4a resiliently keeps the valve 3a apart from the opening end of the communication hole 7a (as shown in FIG. 3). Because the stopper 5a is a cross rod which does not fully cover the rear opening end of the communication hole 7a when in contact with the rear end surface of the pad body 1 as shown in FIG. 3, the sucking compartment 10a provided in the fore portion of the body 1 is maintained in fluid communication with the suction chamber 12 provided in the rear portion of the body 1.

The spring 4a may be selected to have such a spring constant that allows the spring 4a to compress by a pressure difference which is imparted to the valve 3a due to a continuous air flow drawn from the sucking compartment 10a to the suction chamber 12 for a given period during the vacuum suction by the pump until the valve 3a is brought into contact with the pad body 1 and that maintains the spring 4a in the compressed state by the pressure difference between the sucking compartment 10a and the suction chamber 12 as long as the vacuum suction lasts.

The other valve mechanisms 3b' to 3f' are constructed in exactly the same manner as the above-described valve mechanism 3a' and hence will not be described to avoid unnecessary duplication.

Further, in the embodiment of FIGS. 1 and 2, an automatic switching valve 27 is provided in the pad body 1, which is composed of the above-noted spool valve body 14 and the spool valve 16. This automatic switching valve 27 is designed so as to automatically open or close as the pad body 1 is pressed against or detached from the supporting surface 30.

As seen from FIGS. 1 and 2, the automatic switching valve 27 is disposed within the valve box 21 at a location eccentric to the center of the pad body 1. The spool valve body 14 of the automatic switching valve 27 includes a larger-diameter portion 20, and a smaller-diameter portion 15 that projects through a suction opening 28 formed in the cover 11 into the suction chamber 12 in the pad body 1 and is fixed to the cover 11 by means of a fastener 25. The spool valve body 14 has a spool valve mounting hole 16a formed therein, in which the cylindrical spool valve 16 of metal material is inserted for purposes to be described later. The larger-diameter portion 20 of the spool valve body 14 is received in a spool valve body receiving cylinder 36 in such a manner that it is slidable in the axial direction along the cylinder 36.

The rear end portion of the spool valve mounting hole 16a is formed as a spring receiving hole 17a of an increased diameter, and a compression spring 17 is received in this hole 17a. The rear end of the compression spring 17 is supported by the bottom surface of the spool valve body receiving cylinder 36 so as to normally urge the spool valve body 14 toward the supporting surface 30. The spool valve 16 is provided for axial sliding movement in a cylindrical spacer 18 secured to the spool valve body 14, and a compression spring 19 is provided around the spool valve 16 in front of the spacer 18.

In a condition where the pad body 1 is not in contact with the supporting surface 30, the fore end surface of the larger-diameter portion 20 of the spool valve body 14 is tightly pressed against the rear end surface B of the cover 11 along the periphery of the suction opening 28 so that the automatic switching valve 27 is held in the closed state. The compression springs 17 and 19 each have a flanged portion at one end in order to operate in a telescopic fashion such that, as the spool valve 16 retracts by being pressed against the supporting surface 30, compression of the compression spring 17 first takes place and compression of the compression spring 19 follows only after the spring 17 has completed its compression. The reason why the present embodiment employs two separate compression springs 17 and 19 is based on designing requirements to minimize the length of the valve box 21 while guaranteeing a sufficient stroke of the entire spool valve, and thus where it is not necessary to restrict the length of the valve box 21, the two compression springs 17 and 19 may be replaced with a single compression spring.

The spool valve body 14 provided in the valve box 21 is designed to move rearward along with the retracting movement of the spool valve 16 so that the fore end surface of the large-diameter portion 20 is moved apart from the rear end surface B of the cover 11 to allow the air in the suction chamber 12 to be drawn through the suction opening 28 into the air flow passage 13 within the valve box 21.

Because the automatic switching valve 27 is disposed in the valve box 21 off the center of the pad body 1 toward one side (left side as viewed in FIG. 1) of the body 1 and the connector 22 connecting the air flow passage 13 to the hose 23 is also disposed off the center of the pad body 1 toward the other side (right side as viewed in FIG. 1) of the body 1, the air flow passage 13 directs the air transverse to, rather than in the same direction as, the direction in which the automatic switching valve 27 moves to open. With this arrangement, the direction of the suction force to cause the vacuum-suction attachment pad (i.e., the direction of sucked air flow) is transverse to the direction in which the automatic switching valve 27 moves to open against the biasing force of the compression springs 17 and 19. Thus, the suction force acts radially with respect to the opening direction of the automatic switching valve 27. Further, in this embodiment, the air flow passage 13 is completely separated from the internal space where the compression springs 17 and 19 are provided, to prevent vacuum-sucked air from flowing into the internal space.

The vacuum-suction attachment pad 100 of the present invention constructed in the manner as shown in FIGS. 1 to 3 is fixedly mounted on the tip of an arm mechanism (not shown) that is operated by means of a handle 24 or the like. The pad 100 is attached to the supporting surface 30 in the following manner.

The vacuum pump is actuated after the hose 23 connected at one end to the connector 22 of the vacuum-suction attachment pad 100 is connected at the other end to the vacuum pump. At this stage, the spool valve 16 of the automatic switching valve 27 is urged forward by the compression springs 17 and 19 so that the large-diameter portion 20 of the spool valve body 14 is tightly pressed at its fore end surface against the rear end surface B of the cover 11 to place the switching valve 27 in the closed state.

Then, as the vacuum-suction attachment pad 100 is pressed against the pad supporting surface 30 by the unillustrated arm mechanism, the spool valve 16 of the automatic switching valve 27 comes into abutment against the supporting surface 30, upon which the spool valve 16 is caused to retract against the biasing force of the compression springs 17 and 19 so that the fore end surface moves apart from the rear end surface B of the cover 11. Thus, the suction opening 28 is brought into fluid communication with the air flow passage 13 and hence with the vacuum pump, upon which the air in the suction chamber 12 starts being sucked by the vacuum pump.

In FIG. 3, once the suction of the air in the suction chamber 12 is initiated, the air in the sucking compartment 10a is caused to flow through the sucking hole 6a and communication hole 7a into the suction chamber 12.

At this time, if the sucking compartment 10a is in close contact with a smooth portion of the pad supporting surface 30, the compartment 10a is completely sealed by the partition wall 9 and the supporting surface so that the air in the compartment 10a is instantly sucked into the suction chamber 12, and thus there occurs no sucked air flow lasting more than a predetermined period. Consequently, the compartment 10a is properly attached by vacuum suction to the supporting surface without the valve 3a being closed. Conversely, if the sucking compartment 10a is in contact with an uneven portion of the pad supporting surface, there occurs a sucked air flow from the sucking compartment 10a into the suction chamber 12 during the vacuum air suction, and the valve 3a is gradually pushed backward by the sucked air flow until it is pressed against the fore end surface of the pad body 1 to completely close the suction hole 6a. Once thus pressed against the fore end surface of the pad body 1, the valve 3a is maintained in this pressed condition due to a difference between the air pressure in the sucking compartment (atmospheric pressure) and the air pressure in the suction chamber 12 (almost vacuum). In this way, air leaking from the sucking compartment 3a insufficiently attached to the supporting surface 30 can be prevented from flowing into the suction chamber 12 during the vacuum suction by the pump.

The attachment pad 100 arranged in the above-mentioned manner is capable of properly attaching to the supporting surface 30 despite the presence of unevenness on the surface 30 and will not reduces the arrival degree of vacuum in the suction chamber 12. Thus, the attachment pad 100 can enhance the arrival degree of vacuum in the sucking compartment applied to an even surface and maintain the arrival degree of vacuum in the entire vacuum-suction attachment pad within a desired range. In this way, the air within the pad body 1 is sucked, via the air flow passage 13 and hose 23, into the vacuum pump.

In the case where a plurality of the above-described attachment pads 100 are connected to a single vacuum pump, if the pad body 1 of any of the pads 100 is in poor contact with the supporting surface 30 in effecting attachment to the surface of the pads, that pad can effectively avoid poor vacuum suction without requiring any special operation, because the automatic switching valve 27 of the pad is maintained in the closed state by the corresponding spool valve body 14 pressed against the end surface of the pad body 1 and the vacuum suction is effected only in the other pad closely contacting the supporting surface 30.

Figure 5:
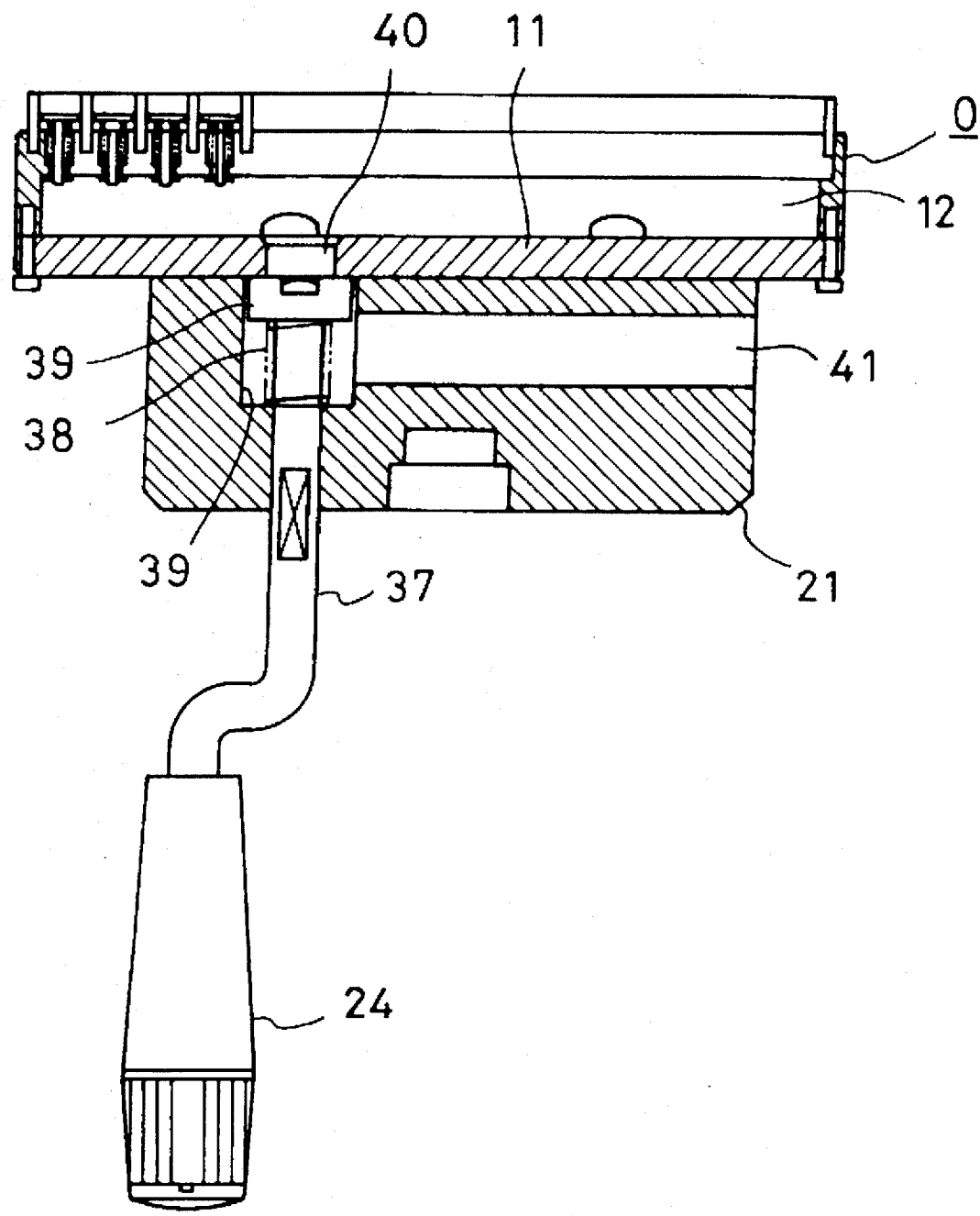
FIG. 5 is a cross-sectional view showing how a handle is engaged in the rear section of the vacuum-suction attachment pad.

Further, according to the embodiment, to release the pad 100 attached to the supporting surface, an air discharge passage 41 is provided for fluid communication with the suction chamber 12 via a suction hole 40 formed in the cover 11 as shown in FIG. 5, which is a cross-sectional view showing how a handle 24 is engaged in the rear section of the vacuum-suction attachment pad 100. Further, in a valve chamber 39 for connecting the suction hole 40 and the air discharge passage 41 and receiving an arm 37 of the handle 24 are provided a valve 39A and a spring 38 which normally urges the valve 39A to close the suction hole 40 while pushing the arm 37 in the forward direction. The attachment pad 100 can be released from the supporting surface 30 just by pulling the handle 24 backward to place the suction chamber 12 and the air discharge passage 41 in fluid communication with each other. Alternatively, air may be supplied from the outside into the suction chamber 12 while the vacuum generation source is OFF, as with the prior art. Once air is supplied via the hose 23, the air is sent through the air flow passage 13 and the suction hole 28 into the suction chamber 12. Then, in the case of the sucking compartment 10a applied to a surface portion having no unevenness, the air is passed though the suction hole 6a of the then-open valve mechanism into the compartment 10a to thereby cancel the vacuum state therein. Conversely, if the sucking compartment 10a is applied to a surface portion having unevenness, no pressure difference occurs between the sucking compartment 10a and the suction chamber 12 so that the valve 3a is pushed forward by the spring. In this way, the vacuum state in the pad body 1 is cancelled.

Next, with reference to FIG. 4, a description will be made as to a case where the vacuum-suction attachment pad 100 is applied to prevent the swing of a suspended cage working on a wall surface.

The cage (not shown) includes a pair of left and right vacuum-suction attachment pads 100a and 100b provided by means of respective arm mechanisms (also not shown), and a single common vacuum pump 33 is connected with the vacuum-suction attachment pads 100a and 100b via hoses 23a and 23b, respectively. Reference characters 31a and 31b denote check valves, 32 a gauge, 34 a connector and 35 a three-phase 200 V power supply.

Two winches are carried in the cage for lifting/lowering the cage along the wall surface, and the cage containing the winches is suspended via two wire ropes.

Also in this case, because each of the pads is abutted against the wall surface via the arm mechanism without requiring any special operations and vacuum suction is sequentially executed starting with the first-abutted pad, proper vacuum-suction attachment can easily be achieved even when the two pads are not simultaneously abutted against the wall surface in a proper manner, so that it is allowed to prevent the swing of the suspended cage.

The preferred embodiment has been described above as applied to a cage working on a wall surface, but it should be appreciated that the embodiment may also be applied to any other working machine that is suspended via wire ropes for performing ascending/descending movement or a combination of ascending/descending movement and horizontal movement.

The arm mechanism may be of any appropriate structure; e.g., the number of arms or the degree of freedom of the arm may be selected as desired by the users. In addition, each of the above-mentioned components may be modified in a variety of ways without departing from the spirit and scope of the present invention.

Moreover, although the above-described embodiment employs the automatic switching valve 27 which closes or opens the air flow passage 13 as the pad is placed into or out of abutment against the supporting surface, a manual switching valve may be provided, in place of the automatic switching valve 27, between the valve box 21 and the hose 23. Alternatively, such a switching valve may be omitted, whether automatic or manual.

As has been described so far, the pad 100 according to the first embodiment is characterized in that the fore end portion of the pad body facing a supporting surface is divided by a partition wall into a plurality of small sucking compartments each communicating with a suction chamber provided in the rear portion of the pad body and that valve mechanisms are provided in flow passages communicating the respective sucking compartments and the suction chamber in such a manner that the valves are caused to close by a sucked air flow resulting from the vacuum suction, with these features, the present invention permits proper vacuum suction in the pad body, with no possibility of insufficient or unsuccessful attachment even when the pad is applied to an uneven surface.

Furthermore, the embodiment achieves such proper attachment in a simple manner without requiring complicated control.

Figure 6:
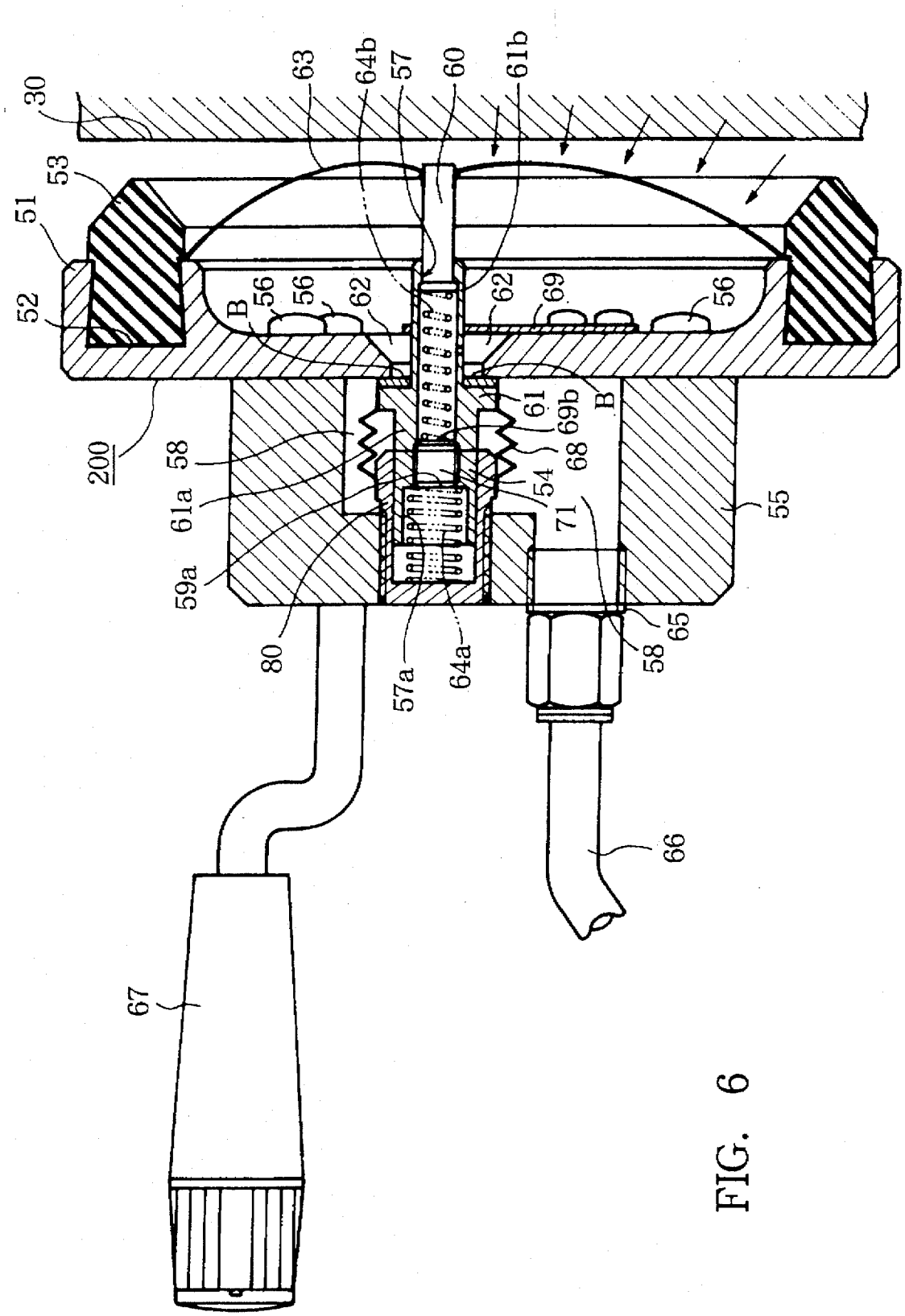
FIG. 6 is a cross-sectional view of a vacuum-suction attachment pad in accordance with a second embodiment of the present invention.
Figure 7:
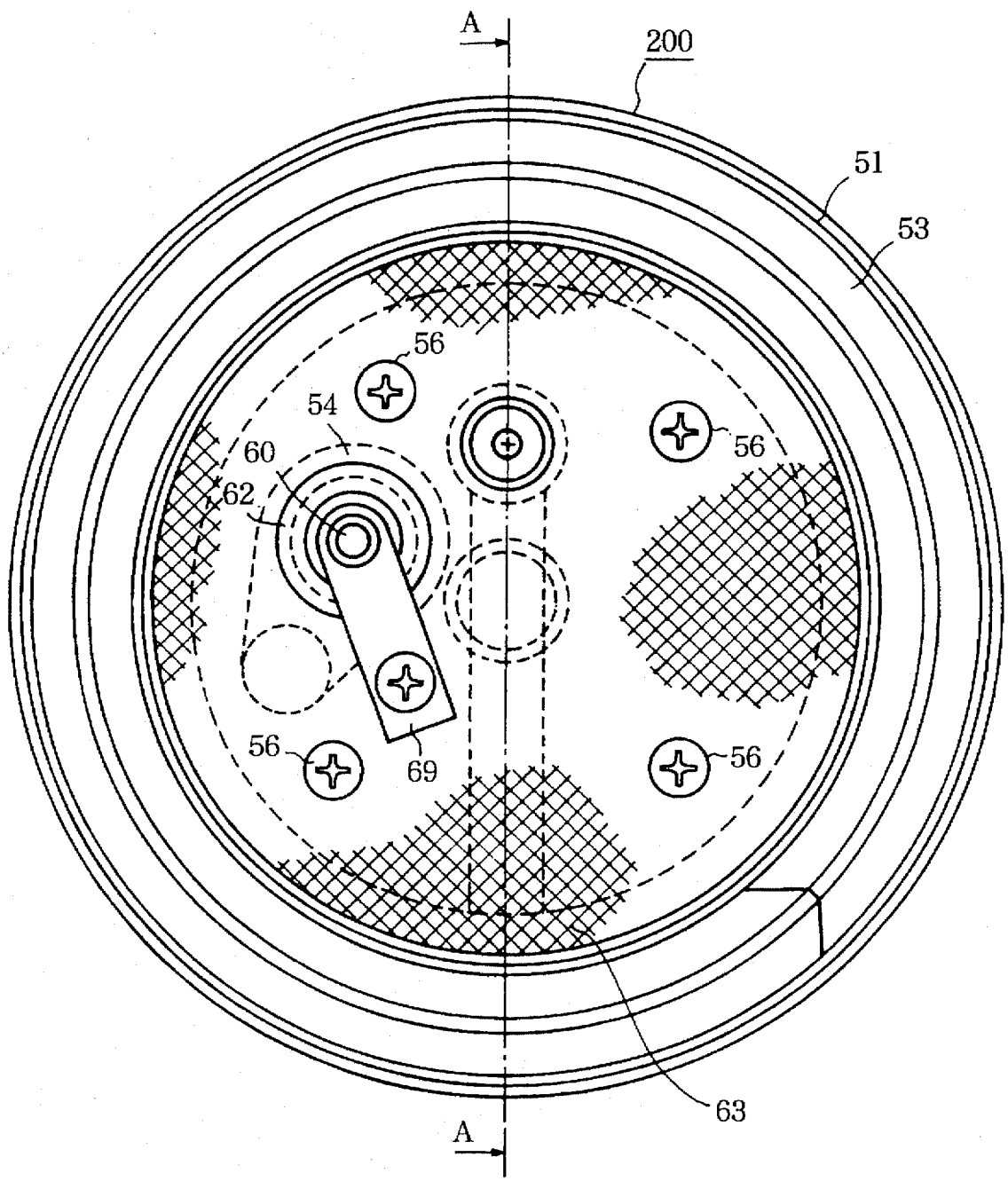
FIG. 7 is a front view of the embodiment of FIG. 6.

Next, a second embodiment of the present invention will be described below with reference to FIGS. 6 and 7, of which FIG. 6 is a cross-sectional view of a vacuum-suction attachment pad 200 in accordance with the second embodiment of the present invention, and FIG. 7 is a front view of the embodiment of FIG. 6.

As shown in these figures, the vacuum-suction attachment pad 200 comprises a pad body 51 of a substantially cylindrical shape which is open at one end (fore end) thereof facing the pad supporting face 30 to which the pad 200 is to attach by vacuum suction. A groove 52 opening toward the supporting surface 30 is formed along the outer periphery of the pad body 51, and the peripheral groove 52 has a trapezoidal cross-sectional shape tapering in the forward direction; i.e., the peripheral groove 52 is narrower in the fore end than in the bottom end.

In the peripheral groove 52 of the pad body 51 is snugly fitted a resilient sealing member 53 comprising a sponge pad. The sealing member 53 has a distal end portion of a triangular cross-sectional shape projecting beyond the groove 52 and a bottom portion of a rectangular cross-sectional shape and is fixedly attached in the peripheral groove 52 by its resiliency.

Similarly to the first embodiment, this second embodiment includes an automatic switching valve 54 provided in the pad body 51, which is designed to automatically open or close as the pad body 1 is pressed against or detached from the supporting surface 30.

As seen from FIG. 7, a cylindrical valve box 55 is secured to the rear end surface of the pad body 51 by means of four screws 56, and the automatic switching valve 54 is disposed in the valve box 55 off the center of the pad body 51. The automatic switching valve 54 including a spool valve body 61 composed of a larger-diameter portion 61a and a smaller-diameter portion 61b. The smaller-diameter portion 61b projects, through a suction opening 62 formed in the pad body 51, into the interior space of the pad body 51 and is fixed to the pad body 51 by means of a spool valve supporting fastener 69. The spool valve body 61 has a spool valve mounting hole 57 formed therein, in which a cylindrical spool valve 60 made of metal material is received. The larger-diameter portion 61a of the spool valve body 61 is received in a spool valve body receiving cylinder 80 for axial sliding movement in and along the cylinder 80.

The rear end portion of the spool valve mounting hole 57 is formed as a spring receiving hole 57a of an increased diameter, and a compression spring 64a is received in this hole 57a. The rear end of the compression spring 57 is supported by the bottom surface of the cylinder 80 so as to normally urge the spool valve body 61 toward the supporting surface 30. The spool valve 60 is slidable in and along a cylindrical spacer 71 secured to the spool valve body 61, and another compression spring 64b is provided around the spool valve 60 in front of the spacer 71.

In a condition where the vacuum-suction attachment pad 200 is not in contact with the supporting surface 30, the fore end surface of the larger-diameter portion of the spool valve body 61 is held in close contact with the rear end surface B of the pad body 51 along the periphery of the suction opening 62 so that the automatic switching valve 54 is held in the closed state. The compression springs 64a and 64b each have a flanged portion at one end thereof in order to operate in such a manner that, as the spool valve 60 retracts by being pressed against the supporting surface 30, compression of the compression spring 64a first takes place and compression of the compression spring 64b follows only after the spring 64a has completed its compression. By virtue of this telescopic arrangement of the springs 64a and 64b, it is allowed to minimize the length of the valve box 55 while guarantee a sufficient stroke of the entire spool valve. However, if it is not necessary to restrict the length of the valve box 55, a single compression spring may replace the two compression springs 64a and 64b. The spool valve body 61 moves rearward along with the retracting movement of the spool valve 60 so that the fore end surface of the large-diameter portion 61 is moved apart from the rear end surface B of the pad body 51 to allow the air in the interior space of the body 51 to be drawn through the suction opening 62 into an air flow passage 58 in the valve box 55.

The automatic switching valve 54 is disposed in the valve box 55 off the center of the pad body 51 toward one side of the body 51 and a connector 65 connecting the air flow passage 58 to a hose 66 is also disposed off the center of the pad body 51 toward the other side of the body 51. In other words, the air flow passage 58 is formed in such a manner that a direction of force acting to cause the automatic switching valve 54 to open differs from a direction of counteractive force against the springs 64a and 64b, and that it directs the air transverse to, rather than in the same direction as, the direction in which the automatic switching valve 54 moves to open. This eccentric arrangement, as in the first embodiment, allows the suction force to act readily with respect to the opening direction of the automatic switching valve 54. Also, in this embodiment, the air flow passage 58 is completely separated from the internal space where the compression springs 64a and 64b are provided, to thereby effectively prevent the vacuum-sucked air from flowing into the internal space.

Further, in this second embodiment, a dust filter 63 made of cloth having 156 meshes per 100 inches is mounted on the fore end of the pad body 51 to cover the opening surrounded by the resilient sealing member 53. This dust filter 63 prevents dust, dirt and other foreign substances in the atmosphere from entering the interior of the attachment pad 200; particularly, the filter 63 prevents the foreign substances from entering between the spool valve body 61 and the spool valve body receiving cylinder 80 to disturb smooth sliding movement of the body 61 relative to the cylinder 80. Due to the fact that dust, dirt and other foreign substances floating in the atmosphere easily enter a vacuum pump, a large-size dust filter used to be mounted on the pump. Therefore, it was difficult to reduce the overall size of the conventional vacuum pump, and the bulky vacuum pump was one of the causes of poor operability in the suspended cage. However, the foregoing arrangement of the second embodiment can substantially reduce the size of the dust filter to thereby achieve a compact vacuum pump, thus providing highly enhanced operability. Further, to more effectively prevent the foreign substances from entering between the spool valve body 61 and the spool valve body receiving cylinder 80, a collapsible cover 68 in the form of bellows made for example of chloropren rubber is provided around the outer periphery of body 61 and cylinder 80. To avoid occurrence of a pressure difference during the vacuum suction, a plurality of small-diameter vent holes may be formed in the cover 68.

A hose connector 65 is attached to the valve box 55 in communication with the air flow passage 58 and connected to the vacuum pump 72.

The vacuum-suction attachment pad 200 constructed in the above-mentioned manner is secured on the tip of an arm mechanism (not shown) that is operated by means of a handle 67 or the like. This pad 200 is attached to the supporting surface 30 in the same manner as the attachment pad 100 according to the first embodiment, and hence a detailed description will not be made here as to how the pad 200 is attached to the surface 30.

In the case where a plurality of the above-described attachment pads 200 are connected to a single vacuum pump 72, if the pad body 51 of any of the pads 200 is in poor contact with the supporting surface 30 in effecting attachment to the surface of the pads, the present embodiment can effectively avoid poor vacuum suction without requiring any special operations, because the automatic switching valve 54 of the poorly contacting pad 200 is maintained in the closed state by the corresponding spool valve body 61 pressed against the end surface of the pad body 51 and the vacuum suction is effected only in the other pad (or pads) closely contacting the supporting surface 30.

Further, according to this embodiment, the sponge pad or resilient sealing member 53 is fixed in the groove 52 very simply by its resiliency and the particular shape of the groove 52 without using any adhesive agent, and Hence the sponge pad 53 having worn or been damaged can be readily replaced with new one just by pulling the pad 53 out of the groove 52.

Figure 4:
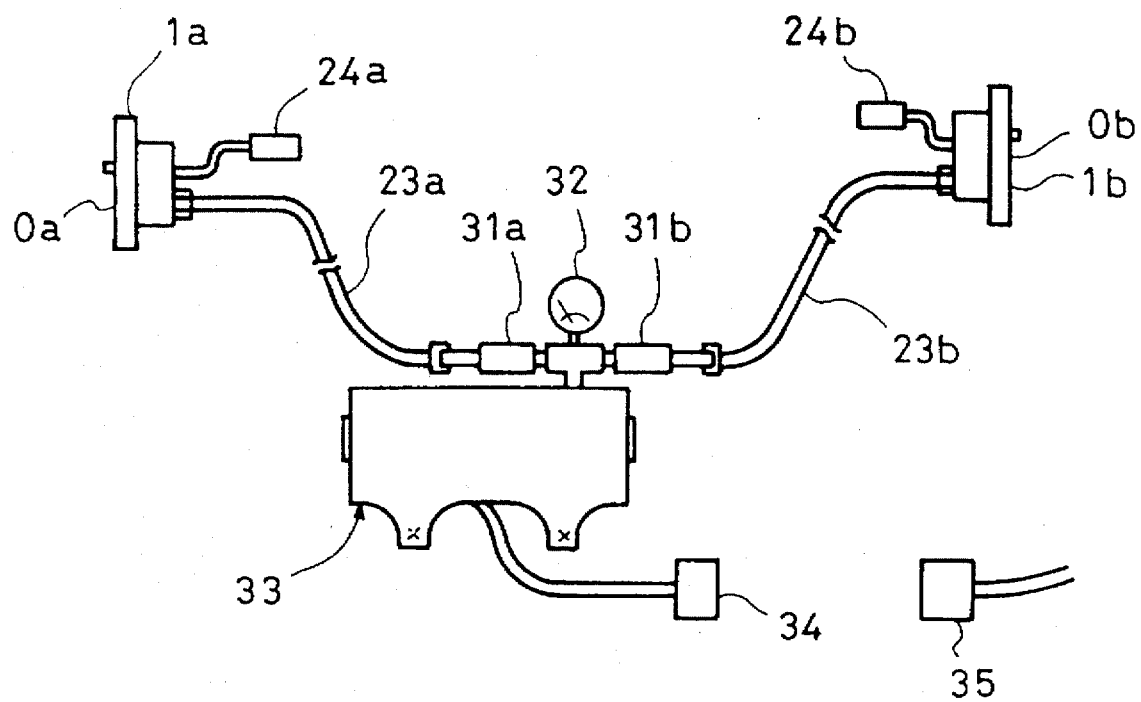
FIG. 4 is a schematic view showing the general arrangement of a vacuum-suction system where the embodiment of the present invention shown in FIGS. 1 to 3 is applied as a device for preventing the swing of a cage which is used, for example, for repairing the outer wall surface of a building.

It should be appreciated that the vacuum-suction attachment pad 200 can of course be advantageously applied as a device for preventing the swing of a suspended cage working on a wall surface, exactly as illustrated in FIG. 4 and described earlier in connection with the attachment pad 100 of the first embodiment.

Also in the second embodiment applied as a swing-preventing device for a suspended cage, because each of the pads 200 is abutted against the wall surface via the corresponding arm mechanism without requiring any special operations and vacuum suction is sequentially executed starting with the first-abutted pad, proper vacuum-suction attachment can easily be achieved even when the two pads are not simultaneously abutted against the wall surface in a proper manner, with the result that it is possible to effectively prevent the swing of the suspended cage.

The second embodiment has been described above as applied to a suspended cage working on a wall surface, but it should be appreciated that the present embodiment may also be applied to any other working machine that is suspended via wire ropes for performing ascending/descending movement or a combination of ascending/descending movement and horizontal movement.

The arm mechanism may be of any appropriate structure depending on the intended application; e.g., the number of arms or the degree of freedom of the arm may be selected as desired by the users. In addition, each of the above-mentioned components may be modified in a variety of ways without departing the spirit and scope of the present invention.

For example, the sponge pad (resilient sealing member) provided along the periphery of the fore end of the pad body may be attached in any other appropriate manner than described above. Namely, the sponge pad may be bonded by an adhesive agent as conventionally known, or, as proposed in Japanese Utility Model Application No. HEI 3-86275, may be resiliently fitted in a peripheral groove which is formed in one side of the pad body facing the pad supporting surface and which has such a trapezoidal cross-sectional shape that is open toward the supporting surface and has a trapeziod bottom greater in width than the opening end.

Although, in the above-described embodiment, the air flow passage 58 has been described as formed to extend in the direction transverse to the direction in which the automatic switching valve moves to open, it may be formed to extend obliquely to the opening direction of the switching valve. Further, the air flow passage 58 may be formed to scatter the air flow so that part of the air flow is guided along the opening direction of the switching valve. Furthermore, although, in the above-described embodiment, the air flow passage is completely separated from the internal space where the compression springs are provided, it may be provided in communication with the part or whole of the spring-provided space. The air flow passage may be formed in a variety of ways as long as it functions to appropriately reduce the vacuum suction force acting against the biasing force of the springs.

As has been described so far, the present invention is characterized in that the air flow passage is formed in such a manner that a direction of force acting to cause the automatic switching valve to open differs from a direction of counteractive force against the spring structure. Because this arrangement reduces the suction force acting against the urging force of the spring structure, it is sufficient to employ the spring structure of a smaller spring constant corresponding to the thus reduced suction force. Accordingly, it is possible to lessen the reactive force occurring as the attachment pad is abutted against the supporting surface, to thereby solve the problem that the pad body is accidentally detached from the supporting surface at a great lifted height.

What is claimed is:

1. A vacuum-suction attachment pad comprising:

a pad body adapted to be abutted against an external pad supporting surface to which said pad is to attach by vacuum suction:

an air flow passage provided in a rear portion of said pad body adapted to be remote from the pad supporting surface for communication with an interior of said pad body:

an automatic switching valve provided in a part of said air flow passage in such a manner that said switching valve is adapted to open in response to contact with said external pad supporting surface: and spring means normally urging said automatic switching valve to close, said air flow passage being formed in such a manner that a direction of force acting to cause said automatic switching valve to open differs from a direction of counteractive force against said spring means, and said automatic switching valve including a valve body normally urged by said spring means, a valve body receiving cylinder which receives said valve body for sliding movement therein, and a sealing structure provided around and between the outer periphery of said valve body and the outer periphery of said valve body receiving cylinder for preventing foreign substances from entering between said valve body and said valve body receiving cylinder from the pad supporting surface side.

2. A vacuum suction attachment pad as defined in claim 1 which further comprises a dust filter mounted on said pad body to protect an interior of said pad from dust and other foreign substances.

* * * * *